(12) United States Patent
Konttori et al.

(10) Patent No.: US 9,905,143 B1
(45) Date of Patent: *Feb. 27, 2018

(54) DISPLAY APPARATUS AND METHOD OF DISPLAYING USING IMAGE RENDERERS AND OPTICAL COMBINERS

(71) Applicant: Varjo Technologies Oy, Helsinki (FI)

(72) Inventors: Urho Konttori, Helsinki (FI); Klaus Melakari, Oulu (FI); Oiva Arvo Oskari Sahlsten, Salo (FI); Kseniia Duginova, St. Petersburg (RU)

(73) Assignee: Varjo Technologies Oy, Helsinki (FI)

( * ) Notice: Subject to any disclaimer, the term of this patent is extended or adjusted under 35 U.S.C. 154(b) by 0 days.

This patent is subject to a terminal disclaimer.

(21) Appl. No.: 15/633,868

(22) Filed: Jun. 27, 2017

Related U.S. Application Data

(63) Continuation-in-part of application No. 15/366,424, filed on Dec. 1, 2016, now Pat. No. 9,711,072.

(51) Int. Cl.
| | |
|---|---|
| *G06F 1/00* | (2006.01) |
| *G09G 3/00* | (2006.01) |
| *G02B 7/18* | (2006.01) |
| *G02B 7/04* | (2006.01) |

(52) U.S. Cl.
CPC ............... *G09G 3/003* (2013.01); *G02B 7/04* (2013.01); *G02B 7/1805* (2013.01); *G09G 3/002* (2013.01); *G09G 2340/12* (2013.01); *G09G 2354/00* (2013.01)

(58) Field of Classification Search
CPC .. G06K 9/00671; G06F 3/013; H04N 9/3129; G02B 13/02; G06T 1/0007
See application file for complete search history.

(56) References Cited

U.S. PATENT DOCUMENTS

| | | | | |
|---|---|---|---|---|
| 6,226,122 | B1 * | 5/2001 | Sugawara | G02B 13/02 359/407 |
| 2012/0287331 | A1 * | 11/2012 | Iwane | G06T 1/0007 348/360 |
| 2016/0150201 | A1 * | 5/2016 | Kilcher | H04N 9/3129 348/745 |
| 2016/0240013 | A1 * | 8/2016 | Spitzer | G06F 3/013 |
| 2016/0342840 | A1 * | 11/2016 | Mullins | G06K 9/00671 |

* cited by examiner

*Primary Examiner* — Michael Faragalla
(74) *Attorney, Agent, or Firm* — Ziegler IP Law Group, LLC

(57) ABSTRACT

Disclosed is a display apparatus. The display apparatus includes at least one context image renderer for rendering a context image, wherein an angular width of a projection of the rendered context image ranges from 40 degrees to 220 degrees; at least one focus image renderer for rendering a focus image, wherein an angular width of a projection of the rendered focus image ranges from 5 degrees to 60 degrees; and at least one optical combiner for combining the projection of the rendered context image with the projection of the rendered focus image to create a visual scene, wherein the visual scene is to be created in a manner that at least two different optical distances are provided therein.

14 Claims, 2 Drawing Sheets

DISPLAY APPARATUS AND METHOD OF DISPLAYING USING IMAGE RENDERERS AND OPTICAL COMBINERS

CROSS-REFERENCE TO RELATED APPLICATIONS

This application is a continuation-in-part application of U.S. patent application Ser. No. 15/366,424, entitled "DISPLAY APPARATUS AND METHOD OF DISPLAYING USING FOCUS AND CONTEXT DISPLAYS" and filed on Dec. 1, 2016, the disclosure of which is incorporated herein by reference.

TECHNICAL FIELD

The present disclosure relates generally to representation of visual information; and more specifically, to display apparatuses comprising image renderers and optical combiners. Furthermore, the present disclosure also relates to methods of displaying, via the aforementioned display apparatuses.

BACKGROUND

In current times, the use of technologies such as virtual reality and augmented reality has rapidly increased in applications like gaming, education, healthcare, and so forth. This in turn, has increased exposure of people to such technologies. Typically, such technologies present a simulated environment, often known as 'virtual reality' to a user. Generally, the user uses a device or an apparatus, such as a virtual reality device or an augmented reality device, for experiencing such simulated environment. Usually, these devices are located close to the eyes, and are known, for example, as near-eye displays (NED) or head mounted displays (HMD). Commonly, such devices either have one or two small displays, lenses and other optical elements therein. The displays and optics are typically embedded in a helmet, glasses, or a visor, and the user wears the device on their head in order to have a simulated environment presented thereto. Moreover, the devices provide the user with a feeling of immersion in the simulated environment, using contemporary techniques such as stereoscopy.

However, conventional devices have certain drawbacks, for example, viewing comfort for a user. Ordinarily, a visual scene of the simulated environment is rendered at a fixed optical distance. Such rendering forces the user's brain to unnaturally adapt to conflicting focus cues, such as focus cues associated with physical distance of the display from the user's eyes and focus cues associated with the fixed optical distance of the visual scene within the simulated environment. Furthermore, viewing such visual scene rendered at the fixed optical distance may contribute to occurrence of vergence-accommodation conflict for eyes of the user. Additionally, such rendering reduces a feeling of immersion for the user within the simulated environment and may also lead to visual fatigue for the user. Such visual fatigue for some users can even cause serious side-effects long after cessation of using the device.

Therefore, in light of the foregoing discussion, there exists a need to overcome the aforementioned drawbacks associated with rendering of a visual scene in a simulated environment of the conventional virtual and augmented reality devices.

SUMMARY

The present disclosure seeks to provide a display apparatus.

The present disclosure also seeks to provide method of displaying, via a display apparatus.

The present disclosure seeks to provide a solution to the existing problem of rendering a visual scene at fixed optical distance within a simulated environment. An aim of the present disclosure is to provide a solution that overcomes at least partially the problems encountered in the prior art, and provides a robust and easy to implement display apparatus that overcomes aforementioned drawbacks associated with rendering of visual scenes at fixed optical distance.

In one aspect, an embodiment of the present disclosure provides a display apparatus comprising:
  at least one context image renderer for rendering a context image, wherein an angular width of a projection of the rendered context image ranges from 40 degrees to 220 degrees;
  at least one focus image renderer for rendering a focus image, wherein an angular width of a projection of the rendered focus image ranges from 5 degrees to 60 degrees; and
  at least one optical combiner for combining the projection of the rendered context image with the projection of the rendered focus image to create a visual scene,
  wherein the visual scene is to be created in a manner that at least two different optical distances are provided therein.

In another aspect, an embodiment of the present disclosure provides a method of displaying, via a display apparatus comprising at least one context image renderer, at least one focus image renderer and at least one optical combiner, the method comprising:
  (i) rendering a context image at the at least one context image renderer, wherein an angular width of a projection of the rendered context image ranges from 40 degrees to 220 degrees;
  (ii) rendering a focus image at the at least one focus image renderer, wherein an angular width of a projection of the rendered focus image ranges from 5 degrees to 60 degrees; and
  (iii) using the at least one optical combiner to combine the projection of the rendered context image with the projection of the rendered focus image to create a visual scene,
  wherein the visual scene is created in a manner that at least two different optical distances are provided therein.

Embodiments of the present disclosure substantially eliminate or at least partially address the aforementioned problems in the prior art, and enable accurate and efficient rendering a visual scene.

Additional aspects, advantages, features and objects of the present disclosure would be made apparent from the drawings and the detailed description of the illustrative embodiments construed in conjunction with the appended claims that follow.

It will be appreciated that features of the present disclosure are susceptible to being combined in various combinations without departing from the scope of the present disclosure as defined by the appended claims.

BRIEF DESCRIPTION OF THE DRAWINGS

The summary above, as well as the following detailed description of illustrative embodiments, is better understood when read in conjunction with the appended drawings. For the purpose of illustrating the present disclosure, exemplary constructions of the disclosure are shown in the drawings. However, the present disclosure is not limited to specific methods and instrumentalities disclosed herein. Moreover, those in the art will understand that the drawings are not to scale. Wherever possible, like elements have been indicated by identical numbers.

Embodiments of the present disclosure will now be described, by way of example only, with reference to the following diagrams wherein.

Figure 1:
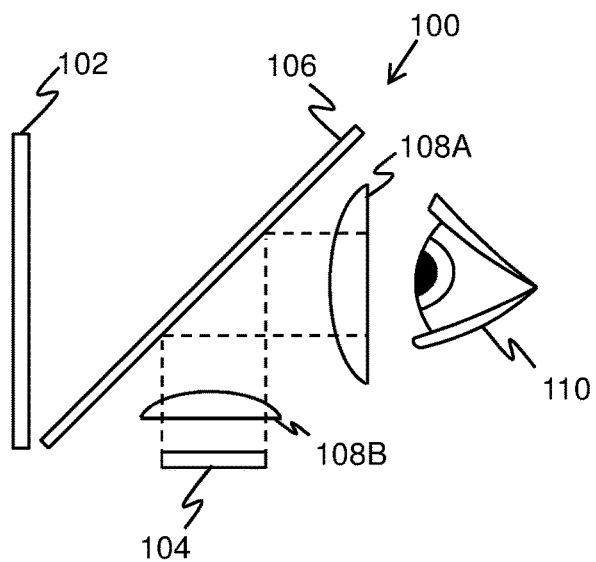
FIGS. 1-3 illustrate exemplary implementations of a display apparatus, in accordance with various embodiments of the present disclosure.

In the accompanying drawings, an underlined number is employed to represent an item over which the underlined number is positioned or an item to which the underlined number is adjacent. A non-underlined number relates to an item identified by a line linking the non-underlined number to the item. When a number is non-underlined and accompanied by an associated arrow, the non-underlined number is used to identify a general item at which the arrow is pointing.

DETAILED DESCRIPTION OF EMBODIMENTS

The following detailed description illustrates embodiments of the present disclosure and ways in which they can be implemented. Although some modes of carrying out the present disclosure have been disclosed, those skilled in the art would recognize that other embodiments for carrying out or practicing the present disclosure are also possible.

In one aspect, an embodiment of the present disclosure provides a display apparatus comprising:
- at least one context image renderer for rendering a context image, wherein an angular width of a projection of the rendered context image ranges from 40 degrees to 220 degrees;
- at least one focus image renderer for rendering a focus image, wherein an angular width of a projection of the rendered focus image ranges from 5 degrees to 60 degrees; and
- at least one optical combiner for combining the projection of the rendered context image with the projection of the rendered focus image to create a visual scene,
- wherein the visual scene is to be created in a manner that at least two different optical distances are provided therein.

In another aspect, an embodiment of the present disclosure provides a method of displaying, via a display apparatus comprising at least one context image renderer, at least one focus image renderer and at least one optical combiner, the method comprising:

(i) rendering a context image at the at least one context image renderer, wherein an angular width of a projection of the rendered context image ranges from 40 degrees to 220 degrees;

(ii) rendering a focus image at the at least one focus image renderer, wherein an angular width of a projection of the rendered focus image ranges from 5 degrees to 60 degrees; and (iii) using the at least one optical combiner to combine the projection of the rendered context image with the projection of the rendered focus image to create a visual scene,
wherein the visual scene is created in a manner that at least two different optical distances are provided therein.

The aforementioned display apparatus and the method of displaying via the display apparatus enable creation of a visual scene in the manner that at least two different optical distances are provided therein. Such creation of visual scene enables increased feeling of immersion within the simulated environment for the user of the display apparatus, thereby providing an improved user experience therefor. Furthermore, such creation of the visual scene enables to provide accurate focus cues to the user. Such focus cues further increase the feeling of immersion for the user and substantially reduces problems associated with rendering of fixed optical distances, such as those associated with vergence-accommodation conflict. It will be appreciated that such reduction of vergence-accommodation conflict allows reduction of visual fatigue and discomfort experienced by the user. Moreover, such reduction of visual fatigue and discomfort allows for improved user experience and consequently, prolonged use of the display apparatus.

The display apparatus comprises the at least one context image renderer for rendering a context image, the at least one focus image renderer for rendering a focus image, and the at least one optical combiner for combining the projection of the rendered context image with the projection of the rendered focus image to create a visual scene. Throughout the present disclosure, the term "context image renderer" used herein relates to equipment configured to facilitate rendering of the context image. Similarly, the term "focus image renderer" used herein relates to equipment configured to facilitate rendering of the focus image. In an example, the visual scene corresponds to a scene within a simulated environment that is presented to a user of the display apparatus. In one example, the display apparatus is associated with a device such as a head-mounted virtual reality device, virtual reality glasses, augmented reality headset, and so forth. In such an instance, the visual scene corresponds to a virtual environment or a real environment including one or more virtual objects that is presented to the user of such device.

In an embodiment, the context image renderer and/or the focus image renderer are implemented by way of at least one projector. In another embodiment, the context image renderer is implemented by way of at least one context display configured to emit the projection of the rendered context image therefrom, and the focus image renderer is implemented by way of at least one focus display configured to emit the projection of the rendered focus image therefrom.

The angular width of the projection of the rendered context image ranges from 40 degrees to 220 degrees. In an example, the angular width of the projection of the rendered context image may be, for example, from 40, 50, 60, 70, 80, 90, 100, 110, 120, 130, 140, 150, 160 or 170 degrees up to 70, 80, 90, 100, 110, 120, 130, 140, 150, 160, 170, 180, 190, 200, 210 or 220 degrees, whereas the angular width of the projection of the rendered focus image may be, for example, from 5, 10, 15, 20, 25, 30, 35, 40, 45 or 50 degrees up to 15, 20, 25, 30, 35, 40, 45, 50, 55 or 60 degrees.

The visual scene is to be created in the manner that at least two different optical distances are provided therein. Throughout the present disclosure, the term "optical distance" used herein refers to a distance between an object within a stereoscopic image (such as the context image and the focus image) and a camera that is used to capture the image. It will be appreciated that in stereoscopic images (or 3D images), a stereoscopic depth is represented by various objects within the image. In such an instance, the optical distance of each object refers to the distance (or stereoscopic depth) of the object within the image, with respect to the camera. In an example, the optical distance of an object within a stereoscopic image is 3 meters. In another example, in a stereoscopic image of a person standing in front of a building, the optical distance between the person and the building is a difference between the optical distances of the person and the building.

Moreover, it will be appreciated that use of stereoscopic images within a simulated environment including objects at various optical distances increases a feeling of immersion within the environment for the user of the display apparatus. In one embodiment, objects at various optical distances are provided in a visual scene by rendering objects at different optical distances on the context image renderer and the focus image renderer. For example, objects that are positioned nearer to the user of the display apparatus within the simulated environment are rendered on the focus image renderer whereas objects that are positioned farther away from the user are rendered on the context image renderer. In one example, the visual scene comprises a park that is seen through a window. In such an instance, the window is rendered as the focus image by the focus image renderer and the park is rendered as the context image by the context image renderer. It will be appreciated that such focus image and context image provide different optical distances within the visual scene by allowing the user to perceive a stereoscopic depth between the window and the park. In an example, the context image and the focus image correspond to different perspectives (or views) of an object. In such an instance, rendering of the different perspectives of the object on the context image renderer and the focus image renderer enable to provide different optical distances in the visual scene. For example, in a visual scene comprising a vehicle, a frontal region of the vehicle is rendered as the focus image and regions that are substantially towards a rear of the vehicle are rendered as the context image. In such an instance, rendering of the different regions of the car on the context and focus image renderers provide different optical distances within the visual scene by allowing the user to perceive the stereoscopic depth along the vehicle (such as, from front to rear of the vehicle).

According to an embodiment, the display apparatus further comprises means for detecting a gaze direction. For example, the means for detecting a gaze direction relates to specialized equipment, such as eye trackers, that allow measurement of a direction of gaze and movement of an eye of the user. The display apparatus further comprises a processor coupled in communication with the at least one optical combiner and the means for detecting the gaze direction, wherein the processor is configured to receive an input image, and use the detected gaze direction to determine a region of visual accuracy of the input image. For example, the input image corresponds to an image displayed on the display apparatus, and the region of visual accuracy relates to a region of the input image whereat the detected gaze direction of the eye is focused. The processor is also configured to process the input image to generate the context image and the focus image, the context image having a first resolution and the focus image having a second resolution, wherein the focus image substantially corresponds to the region of visual accuracy of the input image, and the second resolution is higher than the first resolution. For example, it will be appreciated that human visual system is capable of perceiving greater detail of objects that are associated with the region of visual accuracy, as compared to respect to other objects that may be near or outside a periphery of the region. Consequently, the objects that are associated with the region of visual accuracy of the input image are required to be resolved to much greater detail as compared to the other objects. Therefore, the focus image is provided with the second resolution that is higher than the first resolution associated with the context image.

The processor is further configured to render the context image at the at least one context image renderer and the focus image at the at least one focus image renderer substantially simultaneously, whilst controlling the at least one optical combiner to combine the projection of the rendered context image with the projection of the rendered focus image in a manner that the projection of the rendered focus image substantially overlaps a projection of a region of the rendered context image that substantially corresponds to the region of visual accuracy of the input image. For example, in a visual scene comprising a park that is seen through a window, the visual accuracy corresponds to a region of the window. In such an instance, the window is rendered as the focus image, and the window and the park are rendered as the context image. Furthermore, the at least one optical combiner is controlled to combine the projections of the context and focus images such that the region of the window corresponding to the visual accuracy substantially overlaps the window that is seen in the context image. Alternatively, when the visual accuracy corresponds to a region of the park, the park is rendered as the focus image and the window and park are rendered as the context image. In such an instance, the at least one optical combiner is controlled to combine the projections of the context and focus images such that the region of the park corresponding to the visual accuracy substantially overlaps the park that is seen in the context image. It will be appreciated that in the aforementioned examples, combining the projection of the rendered focus image with the projection of the rendered context image enables to provide different optical distances within the visual scene created on the display apparatus. Furthermore, such different optical distance provided within the visual scene enable a perception of stereoscopic depth for the user of the display apparatus. Moreover, such stereoscopic depth improves a feeling of immersion within a simulated environment for the user of the display apparatus.

In an embodiment, the display apparatus further comprises at least one first controllable lens for adjusting an optical distance of the rendered context image. Throughout the present disclosure, the term "controllable lens" used herein refers to a lens that is operable to have a focal length adjusted thereof. For example, the at least one first controllable lens is coupled to an actuator (for example, such as mechanical or electrical actuator) that is operable to adjust the focal length of the controllable lens. In such an instance, the actuator is further coupled to the processor of the display apparatus and the processor is operable to adjust the optical distance of the rendered image by control of the controllable lens. Moreover, the term "focal length" used herein refers to a distance between the controllable lens (such as a principal axis of the controllable lens) and a convergence point of light rays reflected and/or emitted from an object (such as, on an image sensor or film of a camera). It will be appreciated that a higher focal length is associated with a smaller visual field captured in an image. However, the higher focal length will be associated with higher magnification of objects within the image. In such an instance, the optical distance of the rendered context image is adjusted by adjusting the focal length of the at least one first controllable lens, such as, to focus and/or magnify an object within a visual scene. For example, in a visual scene comprising a building, the focal length of the at least one first controllable lens is adjusted to increase (or decrease) a distance between the user and the building. In one example, the at least one first controllable lens is positioned on an optical path between the at least one context image renderer and an eye of the user.

According to an embodiment, a focal length of the at least one first controllable lens is to be adjusted at a rate that is substantially similar to a refresh rate of the at least one context image renderer. Throughout the present disclosure, the term "refresh rate" used herein refers to a number of times per second that an image rendered on an image renderer is updated. For example, a user of the display apparatus shifts their gaze direction on the context image from near to far visual field. In such an instance, the context image rendered on the at least one context image renderer is refreshed at 210 Hz to correspond to the gaze shift. In another example, the context image is rendered at 3 optical distances corresponding to increasing (or decreasing) stereoscopic depths that are refreshed at rate of 70 Hz. Furthermore, in such instance, the focal length of the controllable lens is adjusted at a rate of 210 Hz to correspond to the refresh rate of the context image renderer. In one embodiment, the refresh rate of the at least one context image renderer is in a range of 90-1800 Hz.

In an embodiment, the display apparatus further comprises at least one second controllable lens for adjusting an optical distance of the rendered focus image. For example, the second controllable lens is positioned on the optical path between the focus image renderer and the eye of the user. In one example, the user of the display apparatus shifts their gaze direction from far to near visual field to focus on an object within the rendered focus image. In such an instance, a focal length of the at least one second controllable lens is adjusted to enable the user to focus on the object. According to one embodiment, a focal length of the at least one second controllable lens is to be adjusted at a rate that is substantially similar to a refresh rate of the at least one focus image renderer. In one embodiment, the refresh rate of the at least one focus image renderer is in a range of 90-1800 Hz. It will be appreciated that the adjustment of the at least one first controllable lens and the at least one second controllable lens for adjusting the optical distance of the rendered context image and the rendered focus image respectively, enables to provide focus cues (or depth cues) to the user of the display apparatus. Furthermore, such depth cues enable better perception of stereoscopic depth within the visual scene, thereby increasing a feeling of immersion of the user within a simulated environment presented on the display apparatus. Additionally, such depth cues enable to substantially reduce occurrence of vergence-accommodation conflict associated with conventional display apparatuses.

In one embodiment, the display apparatus further comprises two prisms arranged in proximity to each other and at least one actuator for adjusting a distance between the two prisms, wherein the distance between the two prisms is to be adjusted to switch between the at least two different optical distances. It will be appreciated that a prism enables change of path of light from a source, such as, by refraction thereof. Furthermore, the two prisms of the display apparatus enable to switch between the two different optical distances by changing the path of light associated with projection of a rendered image from an image renderer. Moreover, adjusting the distance between the two prisms enables more optical distances to be provided, for example, when more than two optical distances are required. For example, the two prisms are positioned on an optical path between the context image renderer and the eye of the user. In one example, the at least two different optical distances correspond to a near visual field and a far visual field of the context image. In such an instance, adjusting the distance between the two prisms enables to change the projection of the rendered context image, such as, to switch between the near visual field and the far visual field of the context image. In an example, the two prisms are positioned on an optical path between the focus image renderer and an eye of the user. In such an instance, the distance between the two prisms is adjusted to focus (or defocus) the focus image based on visual accuracy. According to an embodiment, the at least one actuator is controlled by the processor to enable switching between the at least two different optical distances.

According to an embodiment, the at least one context image renderer and/or the at least one focus image renderer are implemented by way of at least one display, the at least one display comprising at least a first set of pixels and a second set of pixels, wherein a first optical distance provided by the first set of pixels is different from a second optical distance provided by the second set of pixels. It will be appreciated that the user will be capable of perceiving greater detail in an object that is closer thereto as compared to an object that is farther away therefrom. In such an instance, the object that is closer to the user will have higher pixel density as compared to the object that is farther away from the user. For example, the at least first set of pixels comprises pixels that are clustered closer to each other as compared to the at least second set of pixels. In such an instance, the at least first set of pixels corresponds to a near visual field and the at least second set of pixels corresponds to a far visual field in a visual scene. Such difference in pixel densities associated with the at least first set of pixels and the at least second set of pixels enables to create different optical distances within the visual scene, such as the first optical distance and the second optical distance. In an embodiment, the second set of pixels corresponds to defocus blur in a visual scene. It will be appreciated that objects that are not associated with visual accuracy in an image correspond to defocus blur therein. For example, in a visual scene comprising a building, the visual accuracy relates to the building that is rendered as the focus image. In such an instance, pixels associated with objects that are in proximity to the building are blurred, to simulate defocus blur. Further, such defocus blur enables to increase the perception of stereoscopic depth for the user, which further increases a feeling of immersion within a simulated environment for the user. Moreover, the defocus blur enables to reduce occurrence of vergence-accommodation conflict for the user of the display apparatus. In one embodiment, the at least one display comprises a third set of pixels, wherein an optical distance provided by the third set of pixels is different from the first and second optical distances. For examples, the third optical distance corresponds to an intermediate visual field that lies between the near visual field and the far visual field.

In one embodiment, the at least one focus image renderer is implemented by way of at least one display comprising an array of pixels, and wherein the display apparatus further comprises at least one array of micro-lenses positioned in front of the array of pixels of the at least one display, the at least one array of micro-lenses being arranged to magnify at least one region of the focus image rendered by their corresponding pixels of the array of pixels in a manner that a desired optical distance is provided for the at least one region of the focus image. In an example, the at least one display comprises an array of micro-displays. In such an instance, the micro-displays are operable to render different perspectives (or views) of an object as different regions of the focus image. For example, the different perspectives of the object correspond to a light field associated with a visual scene. Moreover, each region comprises an array of pixels. In one example, the different regions corresponding to different optical distances of the focus image are magnified by the array of micro-lenses. Thereafter, projections of the magnified regions are combined by the optical combiner of the display apparatus. Furthermore, such combination of the magnified regions enables creation of a visual scene corresponding to different optical distances on the eye of the user. Moreover, the user of the display apparatus may shift their gaze to perceive the visual scene at a desired optical distance.

According to one embodiment, the at least one context image renderer is implemented by way of at least one display comprising an array of pixels, and wherein the display apparatus further comprises at least one array of micro-lenses positioned on an optical path from the at least one display, the at least one array of micro-lenses being arranged to magnify at least one region of the context image rendered by their corresponding pixels of the array of pixels in a manner that a desired optical distance is provided for the at least one region of the context image. In an example, the at least one display comprises an array of micro-displays. For example, a visual scene comprises specular reflection on an object, such as reflection of light emitted from a light source on to the object. In such an instance, a light field associated with the light source is rendered on the at least one display associated with the at least one context image renderer on a first optical distance. Furthermore, a light field associated with the object is rendered on the at least one display associated with the at least one focus image renderer on a second optical distance. Moreover, a light field associated with the specular reflection on the object is on the at least one display associated with the at least one focus image renderer on a third optical distance. Additionally, the projections of images associated with the light source, the object, the specular reflection are combined by the optical combiner. Such rendering of the light fields associated with the light source, the object and the specular reflection at different optical distances enables the user of the display apparatus to focus on the desired optical distance, such as, the desired optical distance corresponding to a visual accuracy associated with the light source, the object or the specular reflection on the object.

In one embodiment, the at least one display is selected from the group consisting of: a Liquid Crystal Display (LCD), a Light Emitting Diode (LED)-based display, an Organic LED (OLED)-based display, a micro OLED-based display, and a Liquid Crystal on Silicon (LCoS)-based display.

The present disclosure also relates to the method as described above. Various embodiments and variants disclosed above apply mutatis mutandis to the method.

DETAILED DESCRIPTION OF THE DRAWINGS

Figure 2:
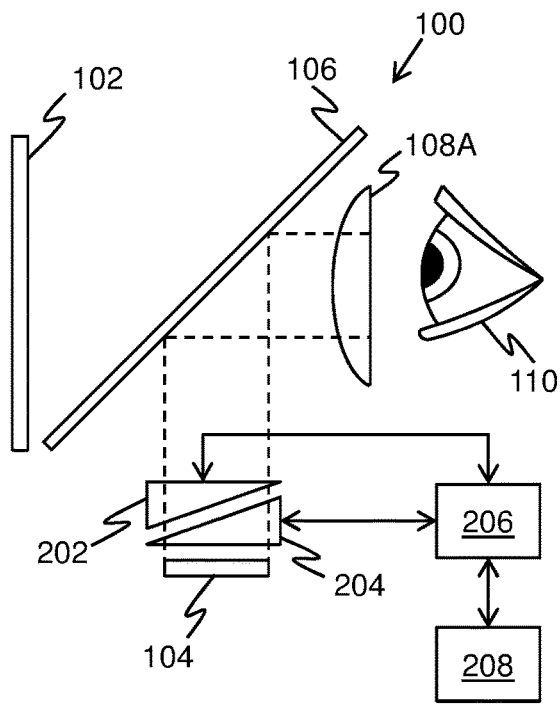
Figure 3:
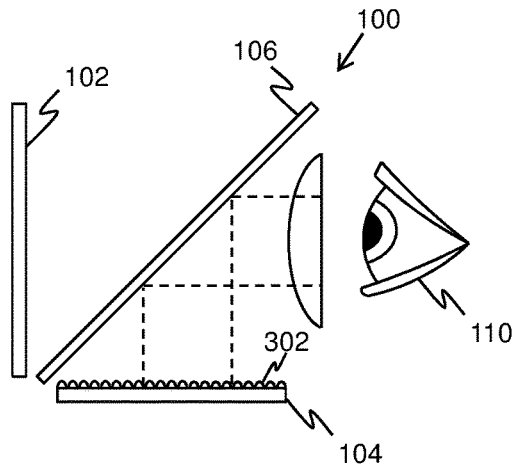

Referring to FIGS. 1-3, illustrated are exemplary implementations of a display apparatus 100, in accordance with various embodiments of the present disclosure. It may be understood by a person skilled in the art that the FIGS. 1-3 include simplified arrangements for implementation of the display apparatus 100 for sake of clarity, which should not unduly limit the scope of the claims herein. The person skilled in the art will recognize many variations, alternatives, and modifications of embodiments of the present disclosure.

Referring to FIG. 1, illustrated is an exemplary implementation of the display apparatus 100, in accordance with an embodiment of the present disclosure. The display apparatus 100 is shown to include at least one context image renderer 102 for rendering a context image, at least one focus image renderer 104 for rendering a focus image, and the at least one optical combiner 106. The at least one optical combiner 106 combines a projection of the rendered context image with a projection of the rendered focus image to create a visual scene. Further, the display apparatus 100 comprises at least one first controllable lens 108A for adjusting an optical distance of the rendered context image. As shown, the at least one first controllable lens 108A is positioned in an optical path between the at least one context image renderer 102 and an eye 110 of a user of the display apparatus 100. Furthermore, at least one second controllable lens 108B is positioned on an optical path between the at least one focus image renderer 104 and the optical combiner 106.

Referring to FIG. 2, illustrated is another exemplary implementation of the display apparatus 100, in accordance with an embodiment of the present disclosure. The display apparatus 100 is shown to include the at least one context image renderer 102, the at least one focus image renderer 104, and the at least one optical combiner 106. As shown, the display apparatus 100 further comprises two prisms 202-204 arranged in proximity to each other and an actuator 206 for adjusting a distance between the two prisms 202-204. As shown, the two prisms 202-204 are positioned on an optical path between the at least one focus display 104 and the at least one optical combiner 106. The at least one actuator 206 moves the two prisms 202-204 with respect to the at least one optical combiner 106. A processor 208 of the display apparatus 100 is configured to control the at least one actuator 206 to adjust a location of the projection of the rendered focus image on the at least one optical combiner 106. Further, the display apparatus 100 includes the at least one second controllable lens 108B positioned on an optical path of projections of the context and focus images.

Referring to FIG. 3, illustrated is another exemplary implementation of a display apparatus 100, in accordance with an embodiment of the present disclosure. The display apparatus 100 is shown to include the at least one context image renderer 102, the at least one focus image renderer 104, and the at least one optical combiner 106. As shown, the at least one focus image renderer 104 comprises an array of pixels (not shown) and at least one array of micro-lenses 302 positioned in front of the array of pixels of the at least one focus image renderer 104.

Figure 4:
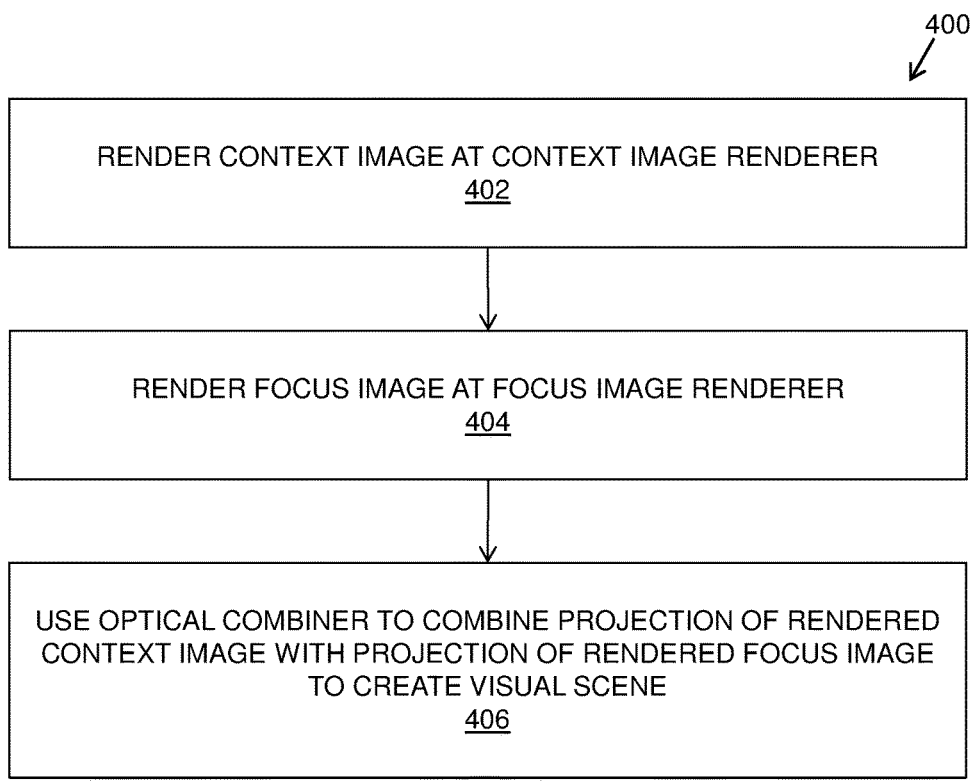
FIG. 4 illustrates steps of a method of displaying via the display apparatus, in accordance with an embodiment of the present disclosure.

Referring to FIG. 4, illustrated are steps of a method 400 of displaying via the display apparatus, in accordance with an embodiment of the present disclosure. At step 402, a context image is rendered at, at least one context image renderer, wherein an angular width of a projection of the rendered context image ranges from 40 degrees to 220 degrees. At step 404, a focus image is rendered at, at least one focus image renderer, wherein an angular width of a projection of the rendered focus image ranges from 5 degrees to 60 degrees. At step 406, at least one optical combiner is used to combine the projection of the rendered context image with the projection of the rendered focus image to create a visual scene, wherein the visual scene is created in a manner that at least two different optical distances are provided therein.

The steps 402 to 406 are only illustrative and other alternatives can also be provided where one or more steps are added, one or more steps are removed, or one or more steps are provided in a different sequence without departing from the scope of the claims herein. For example, the method 400 may further comprise controlling at least one first controllable lens of the display apparatus to adjust an optical distance of the rendered context image. In an example, the method 400 may further comprise controlling at least one second controllable lens of the display apparatus to adjust an optical distance of the rendered focus image. In another example, the display apparatus may further comprises two prisms arranged in proximity to each other and at least one actuator associated with the two prisms, wherein the method 400 further comprises controlling the at least one actuator to adjust a distance between the two prisms, so as to switch between the at least two different optical distances. In an example, the at least one context image renderer and/or the at least one focus image renderer are implemented by way of at least one display, the at least one display comprising at least a first set of pixels and a second set of pixels, wherein the method 400 further comprises controlling the at least one display to provide a first optical distance via the first set of pixels and a second optical distance via the second set of pixels, the first optical distance being different from the second optical distance. For example, the at least one focus image renderer is implemented by way of at least one display comprising an array of pixels, the display apparatus further comprising at least one array of micro-lenses positioned in front of the array of pixels of the at least one display, wherein the method 400 further comprises using the at least one array of micro-lenses to magnify at least one region of the focus image rendered by their corresponding pixels of the array of pixels in a manner that a desired optical distance is provided for the at least one region of the focus image.

Modifications to embodiments of the present disclosure described in the foregoing are possible without departing from the scope of the present disclosure as defined by the accompanying claims. Expressions such as "including", "comprising", "incorporating", "have", "is" used to describe and claim the present disclosure are intended to be construed in a non-exclusive manner, namely allowing for items, components or elements not explicitly described also to be present. Reference to the singular is also to be construed to relate to the plural.

What is claimed is:

1. A display apparatus comprising:
   at least one context image renderer for rendering a context image, wherein an angular width of a projection of the rendered context image ranges from 40 degrees to 220 degrees;
   at least one focus image renderer for rendering a focus image, wherein an angular width of a projection of the rendered focus image ranges from 5 degrees to 60 degrees; and
   at least one optical combiner for combining the projection of the rendered context image with the projection of the rendered focus image to create a visual scene,
   means for detecting a gaze direction; and
   a processor coupled in communication with the at least one optical combiner and the means for detecting the gaze direction, wherein the processor is configured to:
   (a) receive an input image, and use the detected gaze direction to determine a region of visual accuracy of the input image;
   (b) process the input image to generate the context image and the focus image, the context image having a first resolution and the focus image having a second resolution, wherein:
   (i) the focus image substantially corresponds to the region of visual accuracy of the input image, and
   (ii) the second resolution is higher than the first resolution; and
   (c) render the context image at the at least one context image renderer and the focus image at the at least one focus image renderer substantially simultaneously, whilst controlling the at least one optical combiner to combine the projection of the rendered context image with the projection of the rendered focus image in a manner that the projection of the rendered focus image substantially overlaps a projection of a region of the rendered context image that substantially corresponds to the region of visual accuracy of the input image
   wherein the visual scene is created in a manner that at least two different optical distances are provided therein.

2. The display apparatus of claim 1, further comprising at least one first controllable lens for adjusting an optical distance of the rendered context image.

3. The display apparatus of claim 2, wherein a focal length of the at least one first controllable lens is to be adjusted at a rate that is substantially similar to a refresh rate of the at least one context image renderer.

4. The display apparatus of claim 1, further comprising at least one second controllable lens for adjusting an optical distance of the rendered focus image.

5. The display apparatus of claim 4, wherein a focal length of the at least one second controllable lens is to be adjusted at a rate that is substantially similar to a refresh rate of the at least one focus image renderer.

6. The display apparatus of claim 1, further comprising two prisms arranged in proximity to each other and at least one actuator for adjusting a distance between the two prisms, wherein the distance between the two prisms is to be adjusted to switch between the at least two different optical distances.

7. The display apparatus of claim 1, wherein the at least one context image renderer and/or the at least one focus image renderer are implemented by way of at least one display, the at least one display comprising at least a first set of pixels and a second set of pixels, wherein a first optical distance provided by the first set of pixels is different from a second optical distance provided by the second set of pixels.

8. The display apparatus of claim 1, wherein the at least one focus image renderer is implemented by way of at least one display comprising an array of pixels, and wherein the display apparatus further comprises at least one array of micro-lenses positioned in front of the array of pixels of the at least one display, the at least one array of micro-lenses being arranged to magnify at least one region of the focus image rendered by their corresponding pixels of the array of pixels in a manner that a desired optical distance is provided for the at least one region of the focus image.

9. A method of displaying, via a display apparatus comprising at least one context image renderer, at least one focus image renderer and at least one optical combiner, the method comprising:
   (i) rendering a context image at the at least one context image renderer, wherein an angular width of a projection of the rendered context image ranges from 40 degrees to 220 degrees;
   (ii) rendering a focus image at the at least one focus image renderer, wherein an angular width of a projection of the rendered focus image ranges from 5 degrees to 60 degrees; and (iii) using the at least one optical combiner to combine the projection of the rendered context image with the projection of the rendered focus image to create a visual scene, detecting a gaze direction; and using a processor coupled in communication with the at least one optical combiner and the means for detecting the gaze direction to:

(a) receive an input image, and use the detected gaze direction to determine a region of visual accuracy of the input image;

(b) process the input image to generate the context image and the focus image, the context image having a first resolution and the focus image having a second resolution, wherein:

(i) the focus image substantially corresponds to the region of visual accuracy of the input image, and (ii) the second resolution is higher than the first resolution; and (c) render the context image at the at least one context image renderer and the focus image at the at least one focus image renderer substantially simultaneously, whilst controlling the at least one optical combiner to combine the projection of the rendered context image with the projection of the rendered focus image in a manner that the projection of the rendered focus image substantially overlaps a projection of a region of the rendered context image that substantially corresponds to the region of visual accuracy of the input image; and create the visual scene in a manner that at least two different optical distances are provided therein.

10. The method of claim 9, further comprising controlling at least one first controllable lens of the display apparatus to adjust an optical distance of the rendered context image.

11. The method of claim 9, further comprising controlling at least one second controllable lens of the display apparatus to adjust an optical distance of the rendered focus image.

12. The method of claim 9, wherein the display apparatus further comprises two prisms arranged in proximity to each other and at least one actuator associated with the two prisms, wherein the method further comprises controlling the at least one actuator to adjust a distance between the two prisms, so as to switch between the at least two different optical distances.

13. The method of claim 9, wherein the at least one context image renderer and/or the at least one focus image renderer are implemented by way of at least one display, the at least one display comprising at least a first set of pixels and a second set of pixels, wherein the method further comprises controlling the at least one display to provide a first optical distance via the first set of pixels and a second optical distance via the second set of pixels, the first optical distance being different from the second optical distance.

14. The method of claim 9, wherein the at least one focus image renderer is implemented by way of at least one display comprising an array of pixels, the display apparatus further comprising at least one array of micro-lenses positioned in front of the array of pixels of the at least one display, wherein the method further comprises using the at least one array of micro-lenses to magnify at least one region of the focus image rendered by their corresponding pixels of the array of pixels in a manner that a desired optical distance is provided for the at least one region of the focus image.

* * * * *